United States Patent [19]
Bienert

[11] 3,863,979
[45] Feb. 4, 1975

[54] AUTOMOBILE SLIDING ROOF WITH CANOPY FRAME

[76] Inventor: Horst Bienert, Max-Klingerstr. 15, 8035 Gauting, Germany

[22] Filed: Mar. 22, 1973

[21] Appl. No.: 343,878

[30] Foreign Application Priority Data
Mar. 31, 1972 Austria .......................... 82828/72

[52] U.S. Cl............. 296/137 E, 49/360, 296/137 G
[51] Int. Cl.............................................. B60j 7/04
[58] Field of Search ........ 296/137 E, 137 G, 137 B, 296/137 F; 49/216, 218, 360, 362

[56] References Cited
UNITED STATES PATENTS
| | | | |
|---|---|---|---|
| 2,434,711 | 1/1948 | Mobbs | 296/137 F |
| 2,550,323 | 4/1951 | Bishop | 296/137 E |
| 3,290,087 | 12/1966 | Werner | 49/216 |

FOREIGN PATENTS OR APPLICATIONS
| | | | |
|---|---|---|---|
| 477,731 | 1/1938 | Great Britain | 296/137 F |
| 1,233,226 | 5/1960 | France | 296/137 F |

Primary Examiner—Albert J. Makay
Assistant Examiner—Gary Auton
Attorney, Agent, or Firm—Joseph A. Geiger

[57] ABSTRACT

A sliding roof structure with a canopy frame underneath the sliding roof panel, where the rear portion of the canopy frame is supported by the guide shoes of the panel to which the lifting linkage for the rear portion of the sliding roof panel is mounted.

7 Claims, 3 Drawing Figures

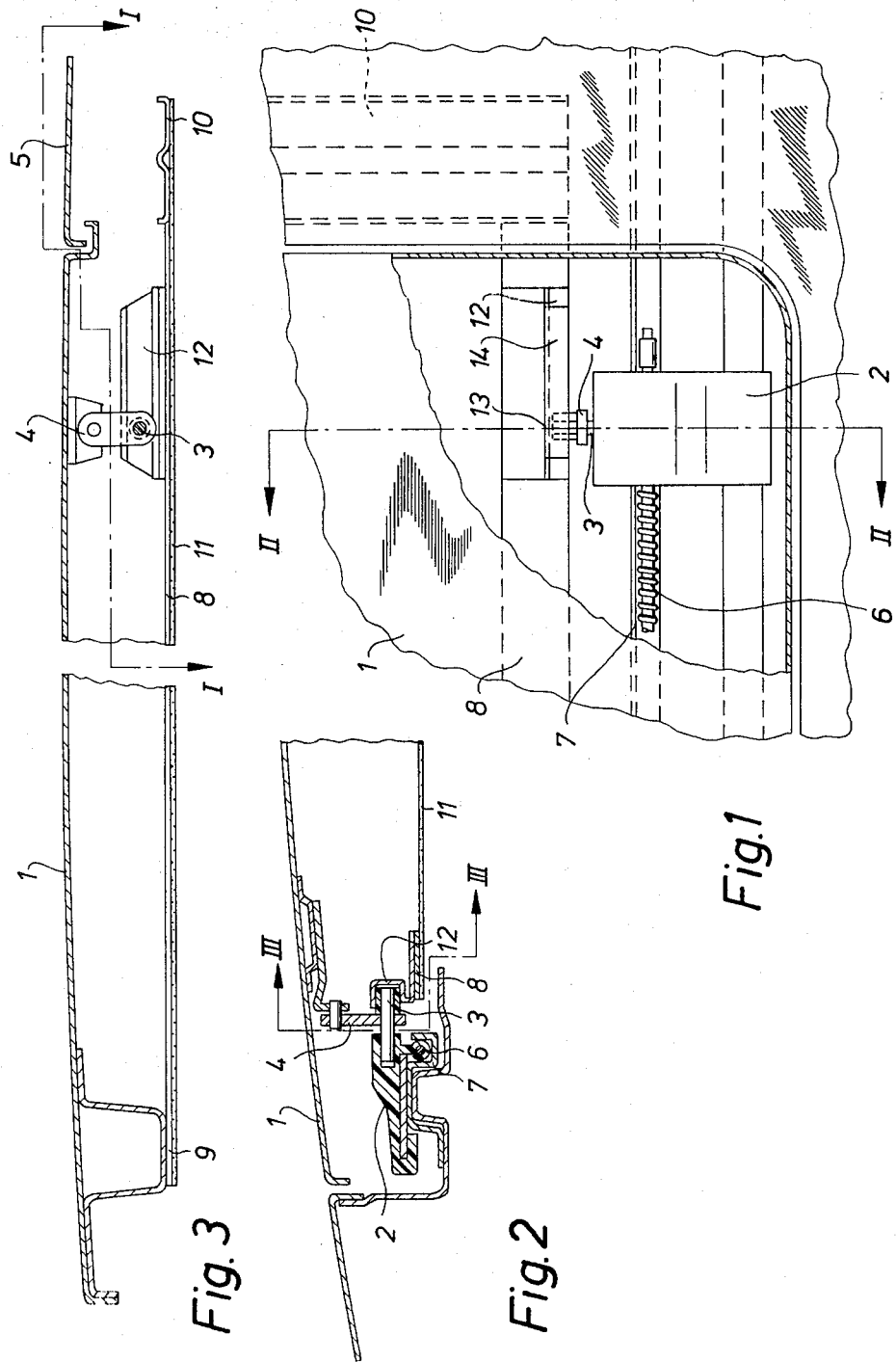

AUTOMOBILE SLIDING ROOF WITH CANOPY FRAME

BACKGROUND OF THE INVENTION

1. Field of the Invention

The present invention relates to automobile sliding roofs, and in particular to rigid sliding roofs which include a canopy frame attached to the front end of the sliding roof structure and articulated with respect to the rear end of the sliding roof so that the latter can be lowered out of its closed position to allow retraction of the sliding roof and canopy frame under the stationary part of the roof structure.

2. Description of the Prior Art

Sliding roofs with canopy frames under the roof panel are known from the prior art. However, these prior art solutions are such that they require separate guide means for both the rear end of the canopy frame and the lifting linkage of the sliding roof panel. A major shortcoming of this prior art design is its comparatively high frictional resistance against the opening and closing motions. Another disadvantage was found after a certain time of operational use, which resulted in excessive clearances in the separate guide means, leading to undesirable rattling noises in the roof structure. The latter is in part due to the difficulty encountered in mounting the separate guide means in precise parallel alignment on the roof structure. Alignment deviations are the source of the earlier-mentioned high frictional resistance, leading in turn to the guide wear and excessive guide clearance from which the rattling tendency follows. A still further shortcoming of this prior art solution relates to the assembly of the device in the roof structure of an automobile, because it requires a mounting procedure in which the guide elements of the sliding roof panel and the guide elements of the canopy frame are simultaneously introduced into their respective guide profiles.

SUMMARY OF THE INVENTION

It is a primary objective of the present invention to overcome the above-mentioned shortcomings. The invention proposes to attain this objective by suggesting a sliding roof structure with a canopy frame in which the rear portion of the canopy frame is vertically supported and constrained by the guide shoes which support the sliding roof panel. The invention thus avoids the need for separate guide means for the canopy frame and the consequent problems mentioned above.

In a preferred embodiment of the present invention, the rear portion of the canopy frame is connected to the guide shoes of the sliding roof panel by means of horizontal connecting members which extend inwardly from the guide shoes and engage a short guide groove in the canopy frame so as to permit a relative horizontal motion between the guide shoes and the canopy frame during operation of the lifting linkages which raise and lower the rear portion of the sliding roof panel. The frictional resistance during opening and closing of the roof is thus minimized and reduced to the raising and lowering motions, the canopy frame being supported directly on the panel guide shoes during the remainder of the opening and closing motions. Obviously, this arrangement minimizes operational wear and rattling tendencies, in addition to simplifying the design itself in terms of manufacturing costs and ease of assembly. The elimination of separate guides for the canopy frame on the stationary part of the roof structure has the further advantage of providing additional room for the accommodation of other structural elements and/or of permitting a simpler design of previously complicated elements. For instance, it is now possible to use simple lifting linkages which are directly connected to the panel guide shoes. The new design also makes it possible to use a larger roof opening and to reduce the overall height of the movable sliding roof structure. Lastly, a significant advantage is gained from the simplification of the assembly operation, because it is no longer necessary to simultaneously introduce the sliding roof panel and the canopy frame into separate guides on the roof structure and to carefully re-adjust these guides, if the frictional resistance is excessive. In the preferred embodiment suggested by the invention the canopy frame can be connected to the panel lifting linkages and panel guide shoes before the subassembly is introduced into the stationary roof structure.

The preferred embodiment of the invention further suggests that the connecting members between the canopy frame and the guide shoes of the sliding roof panel are simple pins which extend from the guide shoes into short guide blocks on the canopy frame, each pin being received in a short groove in the guide block. These pins preferably also serve as the pivot points for the short lifting links which connect the rear portion of the sliding roof panel to the guide shoes.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 is a plan view of the rear left-hand portion of a sliding roof in its closed position, with a portion of the sliding roof panel sectioned along line I—I of FIG. 3;

FIG. 2 shows the sliding roof and the stationary roof structure in an elevational transverse cross section along line II-II of FIG 1; and FIG. 3 shows the sliding roof in an elevational longitudinal cross section taken along line III—III of FIG. 2.

DESCRIPTION OF THE PREFERRED EMBODIMENT

In the longitudinal cross section of FIG. 3 is shown a sliding roof structure embodying the invention. The sliding roof panel 1 is shown in its closed position in which it bears against the stationary roof portion 5. It is maintained in this position by means of a lifting linkage which consists of a short link 4 supported by a pivot pin 3 which extends from a horizontally movable guide shoe 2. The latter is not only movable relative to the stationary roof structure, but also relative to the roof panel 1, whereby the latter can be raised and lowered through the action of link 4 around pivot pin 3. Thus, a rearward motion of the lifting linkage from its position shown in FIG. 3 first causes link 4 to rotate about pin 3, thereby lowering the rear portion of panel 1, whereupon further rearward motion of the guide shoe entrains the lifting linkage and the panel 1 itself so that the sliding roof is retracted under the stationary roof portion 5.

The drive for the above-mentioned motion is provided by a push-pull cable 6 which is shown in FIGS.

1 and 2. Cable 6 is longitudinally guided within a guide profile 7 which is part of the guide structure for the guide shoes 2 of the sliding roof. One end of cable 6 is connected to guide shoe 2, the other end portion being driven by a known electric or manual drive (not shown in the drawing) which may include a revolving drive nut whereby the cable 6 is advanced or retracted.

Below the sliding roof panel 1 is arranged a flat canopy frame which preferably consists of a resilient vertically bendable support profile 8 on each side of the sliding roof (only one side is shown in FIGS. 1 and 2 of the drawing). The forward ends of the lateral profiles 8 are fixedly connected to a cross member 9 of the sliding roof panel, the limited bendability of these profiles permitting the pivoting of the rear portion of panel 1 relative to the canopy frame into and out of its closed position. The rear ends of the lateral profiles 8 are connected together by means of a canopy cross member 10. The canopy frame thus forms a substantially rectangular support to which a soft canopy 11 is attached.

Each lateral canopy profile 8 carries near its rear end a guide block 12, only the left hand block being shown in FIGS. 1 and 2. The guide block 12 includes a short horizontal guide groove inside which is received the far end of pivot pin 3 of the lifting linkage. The pivot pin 3, being solidary with guide shoe 2, thus carries the rear portion of the canopy frame, the guide groove in the guide block 12 permitting the relative displacement of the lifting linkage during which the guide shoe 2 moves horizontally relative to the sliding roof panel 1 and the canopy frame 8, 10. This short relative motion between the guide shoe 2 and the guide block 12 takes place only during the raising and lowering operation. Thus, when the guide shoe 2 is moved rearward through the action of cable 6, the pivot pin 3 moves from position 13 (FIG. 1) in block 12 to position 14, whereby the link 4 which carries the rear portion of panel 1 is pivoted downwardly around pivot pin 3 until the rear portion of panel 1 is lowered below the level of the stationary roof portion 5, whereupon further rearward motion of the guide shoe 2 retracts the entire sliding roof underneath the roof portion 5. It will be noted that while panel 1 is moved rearwardly as a result of its connection to guide shoe 2, over link 4, the canopy frame is moved in unison there with, because the front ends of its bendable lateral profiles 8 are fixedly attached to the cross member 9 of panel 1. A corresponding motion in reverse sequence takes place during the closing operation, when the lifting linkage raises the rear portion of the roof panel 1, after it has reached its forward end position in which the front portion of panel 1 is inside the roof opening, while the rear portion is underneath it.

During the actual retracting and advancing motions of the sliding roof panel, both the lowered sliding roof panel 1 and the canopy frame 8, 10 are supported on the guide shoes 2, so that a minimum of frictional resistance is encountered during these motions and the panel 1 and canopy frame are prevented from rattling relative to one another and to the longitudinal guide profiles in the roof structure.

It should be understood, of course, that the foregoing disclosure describes only a preferred embodiment of the invention and that it is intended to cover all changes and modifications of this example of the invention which fall within the scope of the appended claims.

What is claimed is:

1. A sliding roof structure for automobiles and the like, comprising in combination:
   a fixed roof structure having a substantially rectangular, vertical opening therein;
   a generally horizontal, movable sliding roof panel matching the outline of the roof opening to serve as a closure element therefor;
   means for operating the sliding roof panel by lowering its rear portion out of the roof opening and then retracting the panel rearwardly under the fixed roof structure, and reversely, by advancing the panel to a position half-way in and half-way below the roof opening and then raising its rear portion into the opening so as to close the roof;
   means for horizontally guiding the sliding roof panel against the roof structure during its retracting and advancing motions; and
   a canopy frame mounted underneath the sliding roof panel, the front portion of the canopy frame being attached to the forward end portion of the panel, the rear portion being vertically movable relative to the panel;
   the canopy frame including connecting means between it and the panel guide means for vertically constraining the canopy frame rear portion relative to the panel guide means, while permitting relative horizontal displacement there between.

2. A sliding roof structure as defined in claim 1, wherein:
   the attachment between the front portions of the sliding roof panel and canopy frame is rigid, and the canopy frame itself is resiliently bendable vertically about said rigid attachment so as to permit said vertical motion of the rear portions of the panel relative to the canopy frame.

3. A sliding roof structure as defined in claim 1, wherein:
   the panel guide means includes a fixed guide profile in the roof structure on either side of the sliding roof panel and matching guide shoes linked to the sliding roof panel, a rear guide shoe being arranged on either side of the rear portion of the panel; and
   the panel operating means includes a lifting linkage connecting each rear guide shoe to the rear portion of the panel.

4. A sliding roof structure as defined in claim 3, wherein:
   the lifting linkages of the panel operating means include mutually aligned horizontal pivot pins connecting them to their associated guide shoes; and
   each lifting linkage further includes an upwardly extending link whose lower end is pivoted at the guide shoe by means of the pivot pin and whose upper end is pivoted at the sliding roof panel, the links being pivotable between a raised position in which they are oriented substantially vertically and a lowered position in which the pivot pins and guide shoes are displaced rearwardly relative to the sliding roof panel.

5. A sliding roof structure as defined in claim 4, wherein:
   the pivot pins of the lifting linkages are fixedly attached to their associated guide shoes and extend inwardly toward one another; and
   the connecting means of the canopy frame are in the form of oppositely facing guide blocks mounted on the rear portion of the canopy frame in adjacent alignment with the pivot pins and cooperating therewith to vertically constrain the canopy frame rear portion relative to the guide shoes.

6. A sliding roof structure as defined in claim 5, wherein:

the connecting means between the canopy frame and the guide shoes further include a horizontal sliding connection between each pivot pin and its associated guide block to permit the horizontal displacement of the guide shoes relative to the sliding roof panel and canopy frame during the raising and lowering of the lifting link.

7. A sliding roof structure as defined in claim 6, wherein:

the horizontal sliding connection between the pivot pin and the guide block is in the form of a horizontal guide groove in the guide block inside which the inner end portion of the pivot pin is guided.

* * * * *